United States Patent [19]
Schneider et al.

[11] 3,878,187
[45] Apr. 15, 1975

[54] POLYPEPTIDE DERIVATIVES OF AMPHETAMINE AND ANALOGS FOR IMMUNOASSAYS

[75] Inventors: Richard S. Schneider, Sunnyvale; Daniel Wagner, Palo Alto, both of Calif.

[73] Assignee: Syva Company, Palo Alto, Calif.

[22] Filed: Sept. 11, 1972

[21] Appl. No.: 287,951

[52] U.S. Cl. ............... 260/121; 23/230 B; 195/63; 195/68; 195/103.5; 260/78 A; 260/112 B; 260/112 R; 260/518 A; 260/519; 260/562 R; 424/12; 424/85; 424/88; 260/112.5; 260/463; 260/471

[51] Int. Cl. ..................... C07g 7/00; C07g 7/02

[58] Field of Search ............... 260/112 R, 121, 78 A

[56] References Cited
UNITED STATES PATENTS

| | | | |
|---|---|---|---|
| 3,690,834 | 9/1972 | Goldstein | 23/230 R |
| 3,704,282 | 11/1972 | Spector | 260/112 X |
| 3,817,837 | 6/1974 | Rubenstein et al. | 195/63 |

OTHER PUBLICATIONS

Chem. Abstracts, Vol. 62, 1965, 486e–f, Ando et al.

*Primary Examiner*—Howard E. Schain

[57] ABSTRACT para-(2-Aminopropyl-1)phenol having nonoxocarbonyl groups and analogs bonded through a hydrocarbon chain to oxygen are employed in preparing derivatives for immunoassays and for the preparation of antibodies for amphetamine and amphetamine analogs. Included among the compounds are derivatives of polypeptides, and intermediates in the preparations of various compounds, particularly products which are stable free radicals and modified active enzymes.

3 Claims, No Drawings

POLYPEPTIDE DERIVATIVES OF AMPHETAMINE AND ANALOGS FOR IMMUNOASSAYS

BACKGROUND OF THE INVENTION

1. Field of the Invention

Immunoassays have been finding wide application for assaying for phsiologically active materials. By employing naturally occurring receptors, one is frequently capable of assaying for a class of compounds, a small group of compounds and in many instances, a single compound, where a number of other compounds may be present of similar and/or dissimilar structure. Among the most popular naturally occurring receptors for immunoassay are antibodies. Since a large number of compounds which are of interest for assaying are not antigenic, but rather haptenic, it is usually necessary to modify the compound of interest, so as to be able to bond the compound to an antigenic protein. The hapten modified protein may then be introduced into an animal for production of antibodies to the hapten.

In modifying the hapten to introduce an active functionality, one must consider a wide variety of potential problems. The modification of the hapten must occur in such a way that antibodies which are formed will recognize the hapten itself. In addition, it may or may not be desirable that the antibody recognize one or more metabolites of the hapten. Also, where the assay is performed by the naturally occurring hapten and the hapten bonded to a detector competing for antibody sites, it is essential that the bridging group between the hapten and detector allows for such competition.

The group introduced must not interact in a detrimental way with the hapten for the purposes of forming antibodies. The bridging group should be capable of being activated, so as to be reactive with both protein and the detector; it is normally preferable to have the same linking group bonded to the protein antigen employed for formation of the antibody, as bonded to the detector for formation of the hapten bound to detector. The bridging should not greatly enhance the lipophilicity of the product. Finally, the bridging group must not be detrimental to the recognition of the modified hapten by the antibody under the conditions employed by the assay.

2. Description of the Prior Art para-(3-Aminopropyl-1)phenoxyacetic acid is described in Japanese Patent No. 12,919, issued 1964, and "A Synthesis of Polyamides by Cyanoethylation of Bisphenols," Part IV. A description of an immunoassay technique employing stable free radicals is described in U.S. Pat. Application Ser. Nos. 105,535, filed Jan. 11, 1971, now abandoned, and 141,516, filed May 10, 1971, now U.S. Pat. No. 3,690,834. For a description of an immunoassay technique employing enzymes, see U.S. Pat. Application Ser. No. 143,609, filed May 14, 1971.

SUMMARY OF THE INVENTION

Novel aliphatic carboxylic acids and derivatives substituted by 2-Aminopropyl-1-phenoxy groups are employed in preparing derivatives for immunoassays. The carboxamides are formed of polypeptides, enzymes, and free radicals, for use in immunoassays or for the preparation of antibodies to amphetamine or amphetamine derivatives.

DESCRIPTION OF THE SPECIFIC EMBODIMENTS

Novel acyl derivatives are employed which have para-(2-Aminopropyl-1) or para-(2-Methylaminopropyl-1)phenoxy substituted aliphatic hydrocarbon non-oxyl carbonyl groups. These functionalities are employed in derivatizing detecting groups for use in immunoassays and for combination with antigenic materials to form antibodies for use in immunoassays.

The acyl group or analogs will normally have at least 12 carbon atoms and not more than about 18 carbon atoms, usually from 12 to 16 carbon atoms. The only heteroatoms will be the heteroatoms of the acyl group, the oxy group and the amine, which will be oxygen, nitrogen and sulfur. The aliphatic divalent group joining the phenoxy group to the non-oxo carbonyl group may be branched or straight chain, usually from 0 to 2 branches of one carbon atom, i.e., methyl, aliphatically saturated or unsaturated, usually from 0 to 1 site of ethylenic unsaturation, and except for methylene, will usually have its free valences other than geminal.

The amide derivatives will vary widely depending on the amine used. The group bonded to the amide nitrogen atom will vary from relatively small stable free radicals of from about 7 carbon atoms and of 115 molecular weight to 18 carbon atoms and about 300 molecular weight to enzymes which are usually from about 15,000 to 200,000 molecular weight to antigenic, synthetic and naturally occurring, polypeptides and proteins which may exceed one million molecular weight.

The amides, depending upon the groups bonded to nitrogen find use in the preparation of antibodies to amphetamine and amphetamine analogs and as reagents in the carrying out of immunoassays for amphetamine and amphetamine analogs. In preparing the antibodies, an activated derivative of the acyl group or analog is reacted with an antigenic substance, normally a polypeptide, to provide at least one amphetamine or methamphetamine derivative bound to the antigenic substance. The derivative is then used in known ways for preparing antibodies.

The compounds of this invention as well as the products prepared therefrom will for the most part have the following formula:

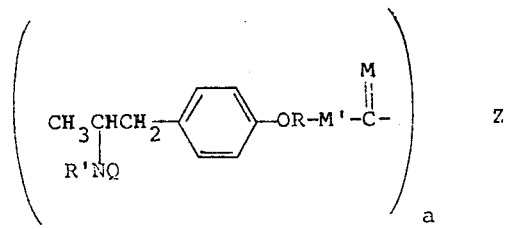

wherein R is a divalent group of from 1 to 10 carbon atoms and 0 to 1 heteroatoms (oxygen or nitrogen, at least 2 carbon atoms from another heteroatom) and usually a divalent aliphatic hydrocarbon group (hereinafter referred to as "aliylene") of from 1 to 6 carbon atoms, more usually of from 1 to 4 carbon atoms and preferably of from 1 to 3 carbon atoms, which may be straight or branched chain, usually straight chain, having not more than two branches, usually methyl, and has from 0–1 site of aliphatic unsaturation, usually ethylenic;

Q is hydrogen or trifluoroacetyl;

R' is hydrogen or methyl;

M' is a bond, but when M is chalcogen (O, S) may be imino (—Nα—), wherein α is hydrogen or is taken together with Z to form a bond (i.e., nitrilo (—N=));

M is oxygen (=O), sulfur (=S) or imino (=NR$^2$), wherein R$^2$ is hydrogen or lower alkyl (1–6 carbon atoms, preferably 1–4 carbon atoms) and usually hydrogen;

a is a number of at least one and may be greater than one when Z is a polypeptide polyamine;

Z is oxy (hydroxyl or hydrocarbyloxy of from 1 to 6 carbon atoms), alkyl carbonate of from 2 to 7 carbon atoms (—OCO$_2$R$^3$, wherein R$^3$ is alkyl of from 1 to 6 carbon atoms, usually 2 to 4 carbon atoms); Y, wherein Y is a polypeptide residue there being one or more amphetamine groups bonded to Y, Y differing from the parent polypeptide by having a number of free valences on amino nitrogen equal to a; or —NH—X, where X is a stable free radical group, usually a stable cyclic nitroxide. When M is imino, Z is hydrocarbyloxy, Y or —NH—X. When Z is Y, the number of amphetamine (includes N-methyl) groups bonded to the amino groups of Z will be at least one and not greater than the number of amino groups present in the parent polypeptide of Z, usually less than the total number of amino groups present in the polypeptide.

When M' is imino there are at least two carbon atoms between the heteroatoms which R bridges.

When Z is a polypeptide, a will range from 1 to about the molecular weight of Z divided by 500, usually 1,500 on the average. Generally, a will range from 1 to 500, usually from 2 to 250.

Q will be trifluoroacetyl when

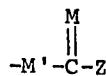

is an activated functionality such as the mixed anhydride, the iminoester and isocyanates (including thio) and may also be present as the intermediate prior to formation of the activated functionality or prior to removal from the final product.

Illustrative bridging groups between the non-oxocarbonyl, and the oxygen of the phenol are methylene, ethylene, propylene, butylene, hexamethylene, 1-methylpropylene, propenylene, and butenylene. For purposes of preparation, normally the carbon atom bonded to phenolic oxygen will be saturated.

For the most part, the compounds of the invention, as well as the amide products derived therefrom, will have the following formula:

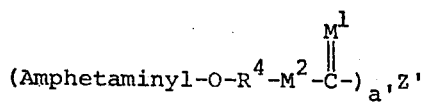

Amphetaminyl is of the formula:

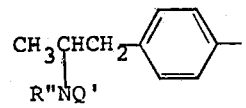

wherein R' is hydrogen or methyl;

Q' is hydrogen or trifluoroacetyl;

R$^4$ is hydrocarbon, usually alkylene, having from 0 to 1 site of ethylenic unsaturation, and of from 1 to 6 carbon atoms, usually of from 1 to 4 carbon atoms;

M$^2$ is a bond, or when M$^1$ is chalcogen, imino (—Nα'—), wherein α' is hydrogen or may be taken with Z' to form a bond between the nitrogen and the carbon atoms, respectively, to which they are attached.

M$^1$ is oxygen, sulfur or imino; and

Z' is hydroxyl, alkoxy (alkyl of from 1 to 6 carbon atoms) alkyl carbonate of from 2 to 7 carbon atoms, usually 3 to 5 carbon atoms, —NH—X, wherein X is a stable free radical group, usually a stable cyclic nitroxide free radical, or Y wherein Y is a polypeptide residue (when M' is imino, Z' is alkoxy, —NH—X, or Y.); and a' is an integer of one except when Z' is Y and is from 1 to the number of amino groups of the parent polypeptide of Y; a' will be on the average from 1 to not greater than the molecular weight of Y divided by about 1,500, usually 2,000.

Those compounds which are amides or analogs thereof will have the following formula:

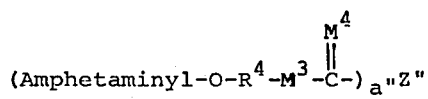

wherein Amphetaminyl and R$^4$ have been defined previously;

M$^3$ is a bond or when M$^4$ is chalcogen may be an imino group;

M$^4$ is oxygen, sulfur or imino;

a" is an integer of at least one and not greater than the molecular weight of Z" divided by about 500, usually 1,500;

Z" is a polypeptide of at least 1,000 molecular weight, usually of at least 5,000 molecular weight, more usually of at least 10,000 molecular weight, having at least one amino group and usually greater than one amino group or a stable free radical amine, usually a stable cyclic nitroxide free radical, and bonded to the carboxyl group primarily through nitrogen.

Those compounds which are employed for linking, either directly or indirectly employed, will for the most part have the following formula:

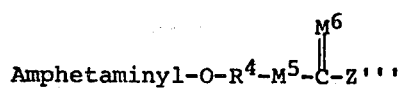

wherein Amphetaminyl and R$^4$ have been defined previously;

M$^5$ is a bond or (—Nα"—), wherein α" is hydrogen or may be taken together with Z''' to form a bond between nitrogen and carbon, i.e., isocyanate and isothiocyanate; and Z''' is hydroxyl, alkoxy, alkoxycarbonate (alkyl of from 1 to 6 carbon atoms) or may be taken together with $M^5$ to from a bond; when $M^5$ is imino, $Z'''$ is alkoxy.

The isocyanate compounds will have the following formula:

Amphetaminyl—O—$R^7$—N=C=$M^7$ wherein Amphetaminyl has been defined previously;
$R^7$ is aliphatic hydrocarbon, usually saturated, having from 2 to 6 carbon atoms, usually 2 to 4 carbon atoms, there being at least two carbon atoms between the heteroatoms; and
$M^7$ is chalcogen (O,S).

The iminoester will have the following formula:

$$\text{Amphetaminyl-O-R}^4\text{-}\overset{\overset{\text{NR}_2}{\|}}{\text{C}}\text{-O-alkyl}$$

wherein all the symbols have been defined previously and alkyl is of from 1 to 6 carbon atoms.

The carboxylic acid (Z=OH) will for the most part have the following formula:

Amphetaminyl—O—$R^4$—$CO_2H$ wherein $R^4$ is aliylene of from 1 to 6 carbon atoms, more usually of from 1 to 4 carbon atoms, and preferably of from 2 to 4 carbon atoms, having from 0 to 1 site of aliphatic unsaturation, usually ethylenic; and Amphetaminyl has been defined previously.

Usually, the two valences of the aliylene will be $\alpha$-$\Omega$, being on the same carbon atom only when $R^4$ is methylene. Also, while the double bond may be terminal, it will usually be other than terminal. That is, the carbon atom bonded to oxygen or nitrogen will be saturated.

The mixed anhydride which finds use in this invention will have the following formula:

Amphetaminyl—O—$R^4$—$CO_2CO_2R^8$ wherein $R^4$ is as defined previously and $R^8$ is alkyl of from 1 to 6 carbon atoms, more usually from 2 to 4 carbon atoms, e.g., ethyl, propyl, butyl, and hexyl.

Illustrative compounds which come within the scope of this invention include 4-[p-(2'-aminopropyl-1')phenoxy]butyric acid, 4-[p-(2'-methylaminopropyl-1')phenoxy]crotonic acid, 3-[p-(2'-aminopropyl-1')phenoxy]propionic acid, ethyl p-(2'-trifluoroacetamidopropyl-1')acetimidate, methyl 3-[p-(N-methyl 2'-trifluoroacetamidopropyl-1')-phenoxy]-propionimidate, 3-[p-(2'-trifluoroacetamidopropyl-1')phenoxypropyl isothiocyanate, 2-[p-(2'-trifluoroacetamidopropyl-1')phenoxyethyl isothiocyanate, N-[4-(p-[aminopropyl-1']phenoxy)]butyl, N'-bovine serum albuminyl thiourea, N-(2-[p-(2'-aminopropyl-1')phenoxy]ethyl N'-bovine serum albuminyl guanidine and N-[2'-(p-[2'-methylaminopropyl-1']phenoxy)]ethyl N-keyhole limpet hemocyanin thiourea.

Of particular interest are compounds where the non-oxo carbonyl substituted amphetamine (including N-methyl) is bonded to an amino group which is part of a polypeptide structure. (In referring to amphetamine, N-methylamphetamine is also intended.) Included among the compounds of this invention are derivatives of polypeptides which are antigenic, so that by bonding the non-oxo carbonyl modified amphetamine to the polypeptide, antibodies can be formed to the amphetamine. A narrower class of polypeptides, which also can be used as antigens, but will not normally be used as such, are enzymes which are employed as the detector in an immunoassay system.

Polypeptides usually encompass from about 2 to 100 amino acid units (usually less than about 12,000 molecular weight). Larger polypeptides are arbitrarily called proteins. Proteins are usually composed of from 1 to 20 polypeptide chains, called subunits, which are associated by covalent or non-covalent bonds. Subunits are normally of from about 100 to 300 amino acid groups (~10,000 to 35,000 molecular weight). For the purposes of this invention, polypeptide is intended to include individual polypeptide units, or polypeptides which are subunits of proteins, whether composed solely of polypeptide units or polypeptide units in combination with other functional groups, such porphyrins as in haemoglobin or cytochrome oxidase.

The first group of protein materials or polypeptides which will be considered are the antigenic polypeptides. These may be joined to the non-oxo carbonyl group of the modified amphetamine through an amino group. The amide product can be used for the formation of antibodies to amphetamine. The polypeptide materials which may be used will vary widely, normally being from about 1,000 to 10 million molecular weight, more usually from 25,000 to 500,000 molecular weight.

Usually, there will be not more than about one amphetamine group per 1,000 molecular weight of polypeptides, usually not more than one amphetamine group per 1,500 molecular weight. There will be at least about one amphetamine group per 500,000 molecular weight, usually at least one per 50,000 molecular weight. With intermediate molecular weight antigens (50,000 to 1,000,000) the number of amphetamine groups will generally be from about 2 to 250, usually from 10 to 100. With low molecular weight antigens (1,000 to 5,000) the number of amphetamine groups will be in the range of 1 to 10, usually in the range of 2 to 5, so that there may be as many as one amphetamine per 500 molecular weight of polypeptide. Usually, the number of groups bonded to the polypeptide will be related to the number of available amino groups, e.g., the number of lysines present.

While the amphetamine may be bonded through the non-oxo carbonyl group to hydroxyls or mercaptans which are present in the polypeptide, for the most part the bonding will be to amino, and therefore, the compounds are described as amides. However, esters and thioesters may also be present.

Amino acids present in proteins which have free amino groups for bonding to the non-oxo carbonyl modified amphetamine include lysine, arginine, histidine, etc. The hydroxylated and mercaptan substituted amino acids include serine, crysteine, and threonine.

Various protein types may be employed as the antigenic material. These types include albumins, serum proteins, e.g., globulins, ocular lens proteins, lipoproteins, etc. Illustrative proteins include bovine serum albumin, keyhole limpet hemocyanin, egg ovalbumin, bovine γ-globulin, etc. Small natural polypeptides which are immunogenic such as gramicidin may also be employed. Various synthetic polypeptides may be employed, such as polymers of lysine, glutamic acid, phenylalanine, tyrosine, etc. either by themselves or in combination. Of particular interest is polylysine or a combination of lysine and glutamic acid. Any synthetic polypeptide must contain a sufficient number of free amino groups, as for example, provided by lysine.

The second group of polypeptides or protein molecules are the enzymes to which the non-oxo carbonyl modified amphetamine may be conjugated. As indicated, the amphetamine modified enzyme is useful for immunoassays. The immunoassay technique will follow in more detail.

Various enzymes may be used, such as peptidases, esterases, amidases, phosphorylases, carbohydrases, oxidases, and the like. Of particular interest are such enzymes as lysozyme, peroxidase, amylase, dehydrogenase, particularly malate dehydrogenase and mannitol 1-phosphate dehydrogenase, β-glucuronidase, cellulase, and phospholipase, particularly phospholipase C. The enzymes will usually have molecular weights in the range of $1 \times 10^4$ to $6 \times 10^5$, more usually in the range of $1.2 \times 10^4$ to $8 \times 10^4$.

There will usually be at least one amphetamine per enzyme molecule and usually not more than one amphetamine per 1,500 molecular weight, usually not more than one amphetamine per 2,000 molecular weight. Usually there will be at least one amphetamine per 50,000 molecular weight, and more usually at least one amphetamine per 30,000 molecular weight.

Where the amphetamine derivative is bonded to a polypeptide, there will be at least one amphetamine group and usually at least two amphetamine groups. With the enzymes the number of amphetamine groups will generally be from 1 to 40, more usually 2 to 35. Usually there will be at least 2, more usually at least 3 amphetamine groups per enzyme when the amphetamine groups are randomly substituted.

The substituted polypeptides will for the most part have the following formula:

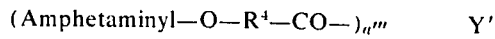
(Amphetaminyl—O—R⁴—CO—)$_{a'''}$       Y' wherein Y' is a polypeptide residue.
Amphetaminyl and R⁴ have been defined previously; and $a'''$ is a number of at least one. The ranges for $a'''$ have been indicated specifically for both antigenic and enzyme polypeptides previously.

Instead of an enzyme, a stable free radical may be employed as the functionality for detection in the immunoassay. The stable free radicals are cyclic nitroxides having the nitrogen of the nitroxide as an annular member and from 0 to 1 other heteroatoms, i.e., oxygen and nitrogen, as annular members. The molecules bonded to the non-oxo carbonyl will normally be of from 8 to 16 carbon atoms, more usually of from 8 to 12 carbon atoms. The amino functionality may be bonded directly to the annular carbon atom or may be bonded to the ring through an aliphatic chain of from 1 to 4 carbon atoms, more usually of from 1 to 2 carbon atoms. The molecules may have from 0 to 2 sites of ethylenic unsaturation, more usually from 0 to 1 site of ethylenic unsaturation.

For the most part, the stable nitroxide functionalities bonded to the carboxyl carbonyl of the carboxyl modified amphetamine will have the following formula:

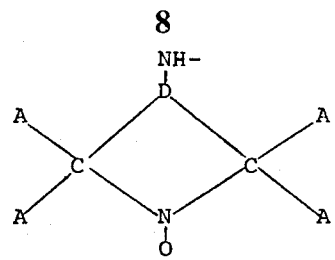

wherein D is a divalent aliphatic radical, usually aliphatically saturated, of from 1 to 6 carbon atoms, more usually of from 2 to 3 carbon atoms, only from 1 to 3, usually 2 to 3, of the carbon atoms in D being annular atoms and A is lower alkyl (1 to 6, usually 1 to 3 carbon atoms), particularly methyl. For the most part, compounds are pyrrolidine or piperidine derivatives.

The carboxylic acid employed in this invention can be prepared from the para -(2-Aminopropyl-1)phenol by first protecting the amino group with a removable acyl group and then substituting the halogen atom of a halo-substituted carboxylic acid with the phenolic oxygen. The reaction is readily carried out in an inert polar solvent, such as a ketone or ether, e.g., acetone. The protective group may then be removed, if desired, or retained during preparation of the mixed anhydride. The protective group should be one which can be readily removed despite the presence of other amide functionalities. Trifluoroacetyl is an illustrative group.

The mixed anhydrides may then be used for reacting with various amino groups, or in the alternative, the carboxylic acid can be activated with carbodiimide. The formation of amides employing either carbodiimide or mixed carbonate anhydride follows conventional procedures.

For the carbonate, chloroformate and a tertiary amine are combined with the acid in an inert polar solvent and the resulting product combined with the amine to form the desired amide. With carbodiimide, usually dialiphatic or dicycloaliphatic carbodiimide, the reagents are brought together in an inert polar solvent and then the product isolated.

For preparing the other functionalities, a halonitrile may be substituted on the oxygen of the hydroxy substituted amphetamine. To prepare the iminoester, the nitrile is treated with alkoxide under mild conditions. To prepare the isocyanates, the nitrile is reduced to the amine, followed by treatment with phosgene, thiocarboxylimidazole or thiophosgene under mild conditions according to known procedures.

After formation of the amide, any protecting groups which are bonded to the amphetamine may be removed by known procedures.

The following examples are offered by way of illustration and not by way of limitation.

(All temperatures unless otherwise indicated are in Centigrade.)

EXAMPLE I p-(2'-Aminopropyl-1')phenoxyacetic acid

A. p-Hydroxyamphetamine . HBr (9.2 g. 40 mmoles) was dissolved in 98 percent formic acid (60 ml) and to the solution, triethylamine (5.6 ml, 40 mmoles) was added very slowly, with external cooling. Acetic anhydride (15 ml) was added slowly, and the reaction mixture stirred overnight at room temperature and evaporated to dryness. The oily residue was dissolved in boiling, saturated sodium bicarbonate solution, and on cooling the N-formyl derivative crystallized out. The crystals were filtered off, and the filtrate extracted with ethyl acetate. Evaporation of the ethyl acetate gave a second crop of the same crystalline compound. Total yield 6.03 g. 84%. M.p. 131°–2°.

B. Potassium carbonate (anhydrous, 15 g) was added to a solution of N-formyl p-hydroxyamphetamine (3.5 g, 19.5 mmoles) in dry acetone (100 ml), followed by the addition of methyl chloroacetate, and the mixture refluxed for 24 hours. The solids were filtered off, washed with acetone, and the filtrate evaporated to dryness. The residue was chromatographed on silica gel, and the ester was eluted with chloroform:methanol (9:1). The product was obtained as an oil, 4.4 g, 89.5%.

C. A mixture of the methyl ester prepared above (7.5 g, 30 mmoles) and 1N sodium hydroxide (100 ml) was stirred at room temperature for 2 hours. The clear solution was acidified with conc. HCl, and the precipitate filtered and washed with a little cold water. The combined washing and filtrate were saturated with sodium chloride and extracted with ethyl acetate. Evaporation of the ethyl acetate left 300 mg of the same compound as the above precipitate. Total yield of the acid 2.8 g., 38% mp 138°–9°. An analytical sample was recrystallized 3 times from ethyl acetate, mp 141°–2°.

Anal. Calc. for $C_{12}H_{15}NO_4$: C, 60.75; H, 6.37; N, 5.90;

F: C, 60.51; H, 6.36; N, 5.96

D. To a suspension of the formamide acid prepared above (1 g, 4.22 mmoles) in water (40 ml) was added 97 percent hydrazine (2.5 ml) followed by the addition of 5.5 ml glacial acetic acid. The pH of the solution was 6.5. The reaction mixture was stirred at 100° for 3 hours, evaporated to dryness and the residue treated with acetone and filtered. The solid aminoacid was washed with acetone to yield 700 mg of a colorless compound, mp 305°–310°(dec., gas evolution).

Anal. Calc. for $C_{11}H_{15}NO_3$: C, 63.14; H, 7.23; N, 6.69;

F: C, 62.02; H, 7.13; N, 6.93.

EXAMPLE II

N-Trifluoroacetyl p-(2′-aminopropyl-1′)phenoxyacetic acid

The amino acid of Example I (0.5 g, 2.4 mmoles) was suspended in trifluoroacetic anhydride (3.5 ml) and the mixture warmed slowly to 80° (at 70° the amino acid was completely dissolved). The clear solution was cooled to room temperature and cold water (30 ml) added. The crystalline trifluoroacetylamino acid (TFA) was filtered and washed with a little water and dried. Yield 6.14 mg, 84%, mp 173°–4°. An analytical sample was recyrstallized from aq. methanol, mp 174°–5°.

Anal. Calc. for $C_{13}H_{14}NO_4F_3$: C, 51.15; H, 4.62; N, 4.58; F, 18.67;

Found: C, 50.99; H, 4.61; N, 4.76; F, 18.62.

EXAMPLE III

Conjugation of p-(2′-aminopropyl-1′)phenoxyacetic acid to bovine serum albumin (BSA)

To a solution of the N-TFA acid of Example II (475 mg, 1.5 mmoles) in dry dimethyl formamide (DMF, 4 ml), cooled in an ice-salt bath (∼−10°), dry triethyl amine (0.21 ml, 1.5 mmoles) was added; the mixture stirred for two minutes, and isobutyl chloroformate (0.19 ml, 1.5 mmoles) added. The reaction mixture was stirred for 15 minutes at −10° to −6°, and then for 15 minutes at 0°. The mixed anhydride thus obtained was added to a fast-stirred solution of bovine serum albumin (BSA, 1.5 g) in a mixture of water (200 ml) sodium bicarbonate (9.5 g) and methanol (90 ml), which was cooled in ice. The clear solution was kept overnight at 0°. Piperidine (30 ml) was added and the mixture stirred at 0° for 2 hours. (This treatment removes the trifluoroacetyl protecting group.) The conjugate was purified by dialysis and gel-filtration.

Determination of the degree of conjugation was based on the UV spectrum of the purified conjugate, taken in 0.1N sodium hydroxide. At that pH, the UV spectrum of BSA shows a maximum at 290 $\mu$, where the p-carboxymethoxy amphetamine has a very low absorption. Use was made of the well-known method (see for example, "Clinical Chemistry, Principles and Techniques" by R. I. Henry, Harper and Row, 1968, pp. 40–41; "Theory and Application of Ultraviolet Spectroscopy", by H. H. Jaffe and M. ORchin, p. 557; "An Introduction to Electronic Absorption Spectroscopy in Organic Chemistry" by A. E. Gillam and E. S. Stern, London, 1962, p. 213) for the photometric determination of the concentrations in mixtures.

The set of equations that apply is:

$$\text{Concentration of BSA in the conjugate} = \frac{\epsilon^{275}_{amph} \times A^{290} - \epsilon^{290}_{amph} \times A^{275}}{\epsilon^{290}_{BSA} \times \epsilon^{275}_{amph} - \epsilon^{275}_{BSA} \times \epsilon^{290}_{amph}}$$

$$\text{Concentration of amphetamine} = \frac{\epsilon^{290}_{BSA} \times A^{275} - \epsilon^{275}_{BSA} \times A^{290}}{\epsilon^{290}_{BSA} \times \epsilon^{275}_{amph} - \epsilon^{275}_{BSA} \times \epsilon^{290}_{amph}}$$

The experimental values are: 
$\epsilon^{275}_{BSA} = 4.8 \times 10^4$
$\epsilon^{290}_{BSA} = 6.2 \times 10^4$
$\epsilon^{275}_{amph} = 1.62 \times 10^3$
$\epsilon^{290}_{amph} = 1.0 \times 10^2$
$A^{240} = 1.09$
$A^{275} = 1.20$ Solving the equations with those values gave 14.2 as the (average) degree of conjugation.

EXAMPLE IV

N-(2′2′, 4′4′-tetramethyl-1-oxylpyrrolidinyl-3) p-(2″-aminopropyl-1″)phenoxyacetamide A. p-Hydroxyamphetamine hydrobromide (4.6 g, 20 mmoles) was dissolved in a half-saturated aqueous solution of sodium chloride (30 ml) and neutralized by the addition of sodium hydroxide (800 mg, 20 mmoles). The free base was extracted with ethyl acetate, but even after complete saturation of the aq. phase with sodium chloride, only 2.3 g of the free amine were obtained.

A solution of the above amine in trifluoroacetic anhydride (20 ml) was prepared at −5° and warmed slowly to 80° (about 40 mins.). Most of the anhydride was removed by evaporation and the residue was crystallized twice from boiling water. mp 126°–7° (2.63 g., 45.7%).

Anal. Calc. for $C_{11}H_{12}F_3NO_2$: C, 53.44; H, 4.89; N, 5.66; F, 23.05

F: C, 53.59; H, 4.92; N, 5.63; F, 23.10.

B. N-Trifluoroacetamido p-hydroxyamphetamine (96 mg, 0.33 moles) was added, under argon, to a suspension of sodium hydride (16 mg, 0.33 mmoles) in dry DMF (5 ml) at 0°. After stirring at room temperature for 40 minutes, 3-(2'-iodoacetamido)-2,2,5,5-tetramethyl-1-pyrrolidinyloxyl (108 mg, 0.33 mmoles) was added and the reaction mixture stirred at room temperature for 6 hours. DMF was evaporated, and the residue partitioned between water and dichloromethane. The yellow gum which was obtained on evaporation of the dichloromethane was dissolved in a few ml of a 1:1 mixture of conc. ammonia and methanol and the solution left overnight at room temperature. The solvent was evaporated and the residue partitioned between ether and 0.1N sodium hydroxide. The residue which was left on evaporation of the ether (mixture of oil and crystals) was pure by thin layer chromatography (TLC) (silica, dichloromethane: methanol 4:1, ethyl acetate:methanol 1:1; Alumina: 5 and 7 percent methanol in chloroform). 54 mg, 46 %. An attempt to purify the compound by preparative TLC (methanol:-chloroform 1:1) gave 30 mg of an oil, which had the characteristic 3-line ESR.

Anal. Calc. for $C_{19}H_{30}N_3O_3$: C, 65.48; H, 8.68; N, 12.06;

Found: C, 63.16; H, 8.64; N, 11.11.

EXAMPLE V

N-Trifluoroacetyl, N-methyl p-(2'-aminopropyl-1')phenoxyacetic acid

A. A mixture of N-TFA p-hydroxyamphetamine (0.5 g, 2 mmoles) potassium carbonate (anhydrous, 1.5 g) methyl chloroacetate (1 ml) and dry acetone (30 ml) was refluxed overnight with exclusion of moisture. The cooled reaction mixture was filtered and the filtrate evaporated to give a crystalline mass. Recrystallization from chloroform-hexane gave needles, mp 105°–6° (555 mg)

Anal. Calc. for $C_{14}H_{16}NO_4F_3$: C, 52.66; H, 5.05; N, 4.38; F, 17.85

F: C, 54.52; H, 5.48; N, 4.05; F, 17.10.

B. To a refluxing mixture of the methyl ester prepared above (160 mg, 0.5 mmole) and methyl iodide (285 mg, 2 mmoles) in dry acetone (5 ml) was added powdered potassium hydroxide (112 mg, 2 mmoles), and heating continued for 8 minutes. Acetic acid (2 ml) was added to the cooled (ice) reaction mixture and the solvent evaporated to dryness. The residue was purified by prep. TLC (silica, ether) to give 95 mg of an oil.

C. Crude methyl ester prepared as above (about 1 gram) was mixed with 1N sodium hydroxide (30 ml) and the mixture kept at 80° for 1 hour. The brown residue which was left on evaporation of the solvent was taken up in 2N hydrochloric acid and the clear solution evaporated to dryness. The well-dried ($P_2O_5$) residue was extracted with boiling iso-propanol (2 × 50 ml) and the brown solution treated with Norite and filtered. Evaporation left a light brown oil. It was mixed with trifluoroacetic anhydride (20 ml) and the mixture refluxed for 1 hour. Evaporation left a gummy residue which was treated with boiling water and then extracted with ether. The ether was dried and evaporated to give an oil (600 mg).

Anal. Calc. for $C_{14}H_{16}NO_4F_3$: C, 52.66; H, 5.05; N, 4.38; F, 17.85

F: C, 49.84; H, 5.07; N, 3.58; F, 18.50.

EXAMPLE VI

Conjugation of N-methyl p-(2'-aminopropyl-1')phenoxyacetic acid to Bovine Serum Albumin (BSA)

The conjugation was carried out in the same way as dexcribed in Example III. The amounts used were: 350 mg (1.1 mmoles) of the product of Example V and one gram of BSA. The conjugate was purified by dialysis (4 days). The yield was 700 mg, and the degree of conjugation, which was calculated from the UV spectrum of the conjugate using the same equation as set forth in Example III was found to be 9.

The conjugate prepared as described in Example III was injected into two sheep, starting with 10 mg in 2 ml saline together with 5 ml of Complete Freund's Adjuvant for the initial innoculation, and 30 mg conjugate in 5 ml saline together with 15 ml of incomplete Freund's Adjuvant for the booster injections. Antibodies are harvested after the passage of an appropriate period after a booster injection according to known procedures.

The following are the data obtained for the first bleed:

TABLE I

| Animal | Serum Concentration, M | γ-Globulin Concentration, M | Binding Constant |
| --- | --- | --- | --- |
| S-26 | $1.7 \times 10^{-5}$ | $9.5 \times 10^{-6}$ | $1.4 \times 10^6$ |
| S-27 | $1.6 \times 10^{-5}$ | $9.5 \times 10^{-6}$ | $1.4 \times 10^6$ |

In carrying out immunoassays, a molecule is employed which will be able to recognize amphetamine or close analogs. For the most part these molecules will be antibodies which are prepared in accordance with known techniques. The antibodies are harvested and may then undergo a variety of purifications. One purification is to enhance the binding capability of the mixture by employing affinity chromatography. This method employs the molecule which the antibody recognizes bound to a solid support. By passing the mixture of gamma-globulin through a column of the compound bound to the support, the gamma-globulin can be concentrated on the support. The gamma-globulin can then be released from the support to provide a product having high activity.

As already indicated, products within this invention are particularly useful for immunoassays. Two significantly different immunoassays are contemplated. The first immunoassay employs free radical compounds. It is found that a free radical compound undergoes a substantial change in its spectrum when the rate of tumbling of the free radical compound in solution significantly changes. The immunoassay depends on observing a change in the spectrum by comparing the spectrum of the free radical compound by itself in solution and when bound to a receptor, such as an antibody. The assay depends on competition for the antibody sites between the compound being assayed and a counterfeit compound having a free radical group and a portion of its structure analogous to a portion of the structure of the compound being assayed.

The counterfeit compound and an unknown solution suspected of containing the compound to be assayed are combined with antibody. To the extent that the compound to be assayed is present, it will compete for the antibody sites and prevent the combination of the counterfeit compound with the antibody. The amount of counterfeit compound able to combine with antibody will be proportional to the amount of compound present in the unknown solution. By following the change in spectrum at a single point, and relating the change to a calibration curve, one can determine very small concentrations of the compound which may be present in the unknown.

In carrying out the assay, polar solvents are normally used, particularly hydroxylic solvents, such as water, aqueous alcohols, e.g., methanol and ethanol, and the like.

The concentration of the antibody in the final solution will usually be about from $10^{-10}$ to $10^{-3}$M based on active sites. The molar concentration for the counterfeit molecule will parallel those of the antibody. The mole ratio of counterfeit compound to antibody active sites will usually be from about 0.5–10 to 1.

Normally, the assay will be carried out in a buffered solution, the pH ranging from about 5 to 10.5, more usually from 7 to 8.5. It is advantageous where an unknown solution is suspected of containing a reductant, of employing a small amount of an oxidizing agent, such as sodium dichromate, sodium perborate, sodium periodate, iodine, etc.

There is no particular order in which the reagents may be brought together, although in some instances, one order of addition will give superior results. After combining the reagents, the solution is agitated, and then introduced into an electronic spin resonance spectrometer cavity. The temperature at which the measurement is made will normally be between 15° to 40° C. There are other variations to the method as are described in copending U.S. application Ser. No. 141,516, filed May 10, 1971, now U.S. Pat. No. 3,690,834.

The following example is illustrative of the method. Reagent solutions were prepared by combining 100 μl of a gammaglobulin solution with 46 μl of the spin labeled compound prepared in Example IV. The gammaglobulin solution was about $9.5 \times 10^{-6}$M in binding sites, and was 0.4M in borate buffer, having a pH of 8.0. The spin label solution was $2.34 \times 10^{-5}$M in the nitroxide compound.

To 10 μl of the above combined solution was added 20 μl of a solution containing a wide variety of drugs. At 250 μg/ml concentration, the ratio of the drug concentration to amphetamine concentration for the same mobilization is reported in the following table:

TABLE II

| Drug | Antibody | |
| --- | --- | --- |
| | S-26 | S-27 |
| Amphetamine | 1 | 1 |
| p-Hydroxyamphetamine | 1 | 1 |
| N-methylamphetamine | 7 | 86 |
| Propylhexedrine | 10 | 20 |
| Phentermine | 11 | 5 |
| Cyclopentamine | 14 | 48 |
| Merphentermine | 14 | 250 |
| Phenylethylamine | 21 | 9 |
| Nylidrin | 25 | 7250 |
| Phenylpropanolamine | 13 | 28 |

By mobilization is intended the amount of the counterfeit compound bonded to free radical or spin label, which is freed by the presence of amphetamine or one of the other drugs. The results are reported for the two different antibodies previously described.

Phenmetrazine, phenylephrine, phenylalanine and ephedrine were all relatively inactive in being able to displace amphetamine.

It is noteworthy that there are significant differences with some of the drugs between the two antibody compositions. However, there is significant recognition with only closely related drugs and substantial differences in activity with both antibodies resulting from small modifications in structure of amphetamine and related compounds. Additional bleeds of the animals would probably also provide some differences in the binding constant as compared to the original bleeds.

The results clearly show that the compounds described in this invention are useful in preparing antibodies which are distinct for amphetamine and closely related compounds and can be used in combination with stable nitroxide free radicals to carry out immunoassays. By carefully choosing animals, further enhancement of the distinction between the methylated secondary amine and the primary amine compounds could be achieved. Also, as described previously, affinity chromatography could be used to modify recognition characteristics of the antibody.

The second assay method employs an enzyme, rather than a stable free radical or spin label as the detector. The mixed anhydride can be bonded to an enzyme in much the same manner as aforedescribed with bovine serum albumin. For example, using lysozyme as illustrative, the mixed anhydride is freshly prepared and added to a solution of lysozyme in water, with the pH initially adjusted to 9.5. The mixed anhydride is at a ratio of 2.5 moles of mixed anhydride per lysine amino group present. There are six lysine groups per lysozyme molecule. The pH is maintained at 9.5 by the addition of 0.1N sodium hydroxide as required. The final lysozyme conjugate will have about four molecules of the amphetamine group per molecule of lysozyme.

The same technique may be used with a wide variety of other enzymes, such as horseradish peroxidase, malate dehydrogenase, alkaline phosphatase, α-amylase, phospholipase, and cellulase. These enzymes are only illustrative of the wide variety of enzymes which may be employed.

A preferred aspect of the assay is to use a system where the enzyme is inhibited when the counterfeit molecule is bound to antibody. Only substantial inhibition is required, not complete inhibition.

In carrying out the assay, it may be carried out substantially in the same manner as with the stable free radical or spin label. Here, however, the enzyme is assayed in accordance with the normal procedures for the enzyme assay. The ratio of enzyme bound to antibody through amphetamine and free enzyme will depend on the amount of amphetamine or like compound present in the solution. Therefore, by preparing a calibration curve one can determine the concentration of amphetamine and/or like compounds in an unknown solution. Since an enzyme molecule can transform a large number of molecules, the system employing an enzyme has a build-in amplification.

The subject compounds of this invention are particularly useful in preparing antigens for the preparation of antibodies which can specifically recognize amphetamine, methamphetamine, and related compounds. Furthermore, the subject compounds of this invention can be used for combination with detection systems such as stable free radical compounds and enzymes for assaying for amphetamine, methamphetamine, and the like. Excellent specificity is achieved so as to distinguish the amphetamine and like compounds from other drugs of similar and dissimilar structure. The antibodies which are formed have good binding constants and high specificity. By various known techniques, the specificity can be varied so as to allow for high particularity as to one or very few compounds, or less particularity for a wider group of like compounds.

The compounds of the subject invention allow for formation of antibodies which have specific recognition for amphetamine and like compounds and do not distort the antibodies, with the result that the antibodies recognize compounds which are dissimilar. In addition, the compounds can be readily prepared and easily derivatized to a reactive derivative so as to combine with a wide variety of amine compounds to provide the desired amide derivatives.

Although the foregoing invention has been described in some detail by way of illustration and example for purposes of clarity of understanding, it will be obvious that certain changes and modifications may be practiced within the scope of the invention, as limited only by the scope of the appended claims.

What is claimed is:

1. An amphetamine derivative of the formula:

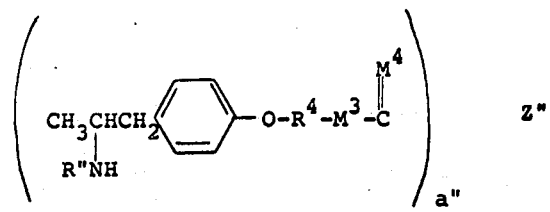

wherein:
R'' is hydrogen or methyl;
R$^4$ is alkylene of from 1 to 4 carbon atoms;
M$^3$ is a bond;
M$^4$ is oxygen;
$a''$ is a number of from one to the molecular weight of Z'' divided by 1,500; and
Z'' is a polypeptide of at least 5,000 molecular weight, wherein Z'' is bonded through amino groups.

2. A compound of the formula:

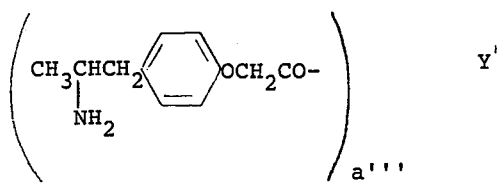

wherein $a'''$ is in the range of 3 to 50 and Y' is a bovine serum albumin residue, wherein said bovine serum albumin residue is bonded through amino groups.

3. An amphetamine derivative according to claim 1, wherein $a''$ is a number of from 1 to 40.

* * * * *